United States Patent
Tsukishima et al.

(10) Patent No.: US 10,647,833 B2
(45) Date of Patent: May 12, 2020

(54) RUBBER COMPOSITION AND PNEUMATIC TIRE USING SAME

(71) Applicant: The Yokohama Rubber Co., LTD., Minato-ku, Tokyo (JP)

(72) Inventors: Shin Tsukishima, Hiratsuka (JP); Miyuki Oka, Hiratsuka (JP); Keisuke Murase, Hiratsuka (JP); Hiroki Sugimoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 145 days.

(21) Appl. No.: 15/327,362

(22) PCT Filed: Jul. 17, 2015

(86) PCT No.: PCT/JP2015/070564
§ 371 (c)(1),
(2) Date: Jan. 18, 2017

(87) PCT Pub. No.: WO2016/010143
PCT Pub. Date: Jan. 21, 2016

(65) Prior Publication Data
US 2017/0158842 A1    Jun. 8, 2017

(30) Foreign Application Priority Data

Jul. 18, 2014  (JP) ................................ 2014-147301
Dec. 12, 2014  (JP) ................................ 2014-251499
Mar. 4, 2015  (JP) ................................ 2015-041986

(51) Int. Cl.
| | | |
|---|---|---|
| C08K 13/02 | (2006.01) | |
| C08K 5/548 | (2006.01) | |
| C08L 9/00 | (2006.01) | |
| C08K 3/36 | (2006.01) | |
| C08K 5/098 | (2006.01) | |
| C08K 5/5419 | (2006.01) | |
| C08L 9/06 | (2006.01) | |
| C08K 5/103 | (2006.01) | |
| C08K 5/40 | (2006.01) | |
| C08K 3/04 | (2006.01) | |
| B60C 1/00 | (2006.01) | |

(52) U.S. Cl.
CPC ............ *C08K 13/02* (2013.01); *B60C 1/0016* (2013.01); *C08K 3/04* (2013.01); *C08K 3/36* (2013.01); *C08K 5/098* (2013.01); *C08K 5/103* (2013.01); *C08K 5/40* (2013.01); *C08K 5/548* (2013.01); *C08K 5/5419* (2013.01); *C08L 9/00* (2013.01); *C08L 9/06* (2013.01); *Y02T 10/862* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,333,375 | B1 * | 12/2001 | Nakamura | C08K 5/098 524/394 |
| 7,371,791 | B2 * | 5/2008 | Hattori | B60C 1/0016 524/270 |
| 2001/0051684 | A1 * | 12/2001 | Luginsland | C08K 5/548 524/492 |
| 2008/0161479 | A1 * | 7/2008 | Amino | C08L 9/06 524/526 |
| 2010/0132868 | A1 * | 6/2010 | Hergenrother | B60C 1/00 152/564 |
| 2010/0324168 | A1 * | 12/2010 | Takizawa | C08L 9/06 523/150 |
| 2011/0226395 | A1 * | 9/2011 | Goto | B60C 1/0016 152/209.1 |
| 2011/0294936 | A1 | 12/2011 | Sato | |
| 2013/0172443 | A1 | 7/2013 | Kushida et al. | |
| 2014/0155524 | A1 * | 6/2014 | Shimizu | C08K 3/36 524/91 |
| 2015/0126643 | A1 | 5/2015 | Satou et al. | |
| 2015/0315358 | A1 | 11/2015 | Yonemoto et al. | |
| 2017/0051134 | A1 * | 2/2017 | Yamagishi | B60C 1/00 |
| 2017/0247532 | A1 * | 8/2017 | Miller | B60C 1/0016 |

FOREIGN PATENT DOCUMENTS

| | | |
|---|---|---|
| DE | 10 2010 030 193 | 9/2011 |
| DE | 10 2011 076 490 | 5/2012 |
| DE | 11 2011 103 060 | 6/2013 |
| DE | 11 2013 001 965 | 12/2014 |
| EP | 2 937 384 | 10/2015 |
| JP | H09-309978 | 12/1997 |

(Continued)

OTHER PUBLICATIONS

Scifinder, CAS # 64536-06-7, American Chemical Society, retrieved Dec. 2018 (Year: 2018).*
Yasura Chemical, 2018 (Year: 2018).*
International Search Report for International Application No. PCT/JP2015/070564 dated Aug. 25, 2015, 3 pages, Japan.

* cited by examiner

*Primary Examiner* — Nicole M. Buie-Hatcher
(74) *Attorney, Agent, or Firm* — Thorpe North & Western

(57) ABSTRACT

The present technology provides a rubber composition containing: (A) a diene rubber, (B) from 5 to 200 parts by mass of silica per 100 parts by mass of the diene rubber, (C) from 1 to 20 mass % of a sulfur-containing silane coupling agent relative to the amount of the silica, (D) for example, from 1 to 20 mass % of n-octyltriethoxysilane relative to the amount of the silica; and (E) from 1 to 20 mass % of a glycerol monofatty acid ester derived from a fatty acid having from 8 to 24 carbons relative to the mass of the silica (B).

11 Claims, No Drawings

(56) References Cited

FOREIGN PATENT DOCUMENTS

| | | | | |
|---|---|---|---|---|
| JP | 2002-275311 | 9/2002 | | |
| JP | 2006-052407 | 2/2006 | | |
| JP | 2007-270040 | 10/2007 | | |
| JP | 2011-052090 | 3/2011 | | |
| JP | 2013-133401 | 7/2013 | | |
| JP | 2014145060 A * | 8/2014 | ............... | B60C 1/00 |
| WO | WO 2012/035998 | 3/2012 | | |
| WO | WO-2012049959 A1 * | 4/2012 | ............... | C08K 3/36 |
| WO | WO 2013/133432 | 9/2013 | | |
| WO | WO 2014/098155 | 6/2014 | | |
| WO | WO-2015166997 A1 * | 11/2015 | ............... | B60C 1/00 |

RUBBER COMPOSITION AND PNEUMATIC TIRE USING SAME

TECHNICAL FIELD

The present technology relates to a rubber composition and a pneumatic tire using the rubber composition; and specifically, the present technology relates to a rubber composition which enhances dispersibility of silica, improves rolling resistance, and exhibits excellent processability, and a pneumatic tire using the rubber composition.

BACKGROUND ART

As demand for even higher performance of tires has increased in recent years, techniques such as blending of silica to a tire to achieve low rolling resistance have come to be known. However, the use of silica may present problems such that the silanol groups present on the surface of the silica particles tend to enhance the aggregation of the silica via formation of hydrogen bonding, thereby increasing the Mooney viscosity of the rubber composition during kneading, and deteriorating processability.

To improve dispersibility of silica, it is advantageous to add a sulfur-containing silane coupling agent with high reactivity. However, such a sulfur-containing silane coupling agent may not be blended in a large amount due to problems in processing, such as scorching of unvulcanized rubber. Thus, there have been problems such as insufficient dispersion of silica leading to failure to achieve good low rolling resistance.

For example, as a conventional technique to enhance processability of a silica-containing rubber composition, Japanese Unexamined Patent Application Publication No. 2006-052407A discloses a technique in which fatty acid and trimethylolpropane are added to a rubber as additives. However, none of conventional technologies has solved the problems described above of the rubber composition yet.

SUMMARY

The present technology provides a rubber composition which enhances dispersibility of silica, improves rolling resistance, and exhibits excellent processability; and a pneumatic tire using the same.

Specifically, the present technology is as follows.

1. A rubber composition comprising:

(A) a diene rubber, (B) from 5 to 200 parts by mass of silica per 100 parts by mass of the diene rubber, (C) from 1 to 20 mass % of a sulfur-containing silane coupling agent relative to the amount of the silica, (D) (D-1) from 1 to 20 mass % of an alkyltriethoxysilane represented by Formula (1) below relative to the amount of the silica, (D-2) from 1 to 20 parts by mass of a fatty acid metal salt per 100 parts by mass of the diene rubber, or (D-3) from 0.1 to 5.0 parts by mass of a thiuram-based vulcanization accelerator per 100 parts by mass of the diene rubber, and (E) from 1 to 20 mass % of a glycerol monofatty acid ester derived from a fatty acid having from 8 to 24 carbons relative to the mass of the silica (B).

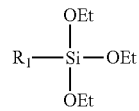

Formula (1)

In Formula (1), $R_1$ represents an alkyl group having from 1 to 20 carbons, and Et represents an ethyl group.

2. The rubber composition according to 1 above, further comprising one or more types selected from the group consisting of copolymers (1) to (3) below and hydrogenated products (4) below:

(1) α-pinene-aromatic vinyl copolymers;

(2) β-pinene-aromatic vinyl copolymers;

(3) copolymers of an aromatic vinyl and two or more types selected from the group consisting of α-pinene, β-pinene, and dipentene; and (4) hydrogenated products of the copolymers of (1) to (3) above.

3. The rubber composition according to 1 above, where the compounded amount of the glycerol monofatty acid ester (E) is from 10 to 1000 mass % relative to the amount of the alkyltriethoxysilane (D) represented by Formula 4. The rubber composition according to any one of 1 to 3 above, where the glycerol monofatty acid ester (E) contains an unsaturated bond.

5. A pneumatic tire using the rubber composition described in any one of 1 to 4 above in a tread.

According to the present technology, by blending, to a diene rubber (A), particular amounts of silica (B), a sulfur-containing silane coupling agent (C), a particular component (D) and a particular glycerol monofatty acid ester (E), a rubber composition which enhances dispersibility of the silica (B), improves rolling resistance, and exhibits excellent processability, and a pneumatic tire using the rubber composition can be provided.

In particular, the alkyltriethoxysilane (D-1) can provide enhanced dispersibility of silica without impairing processability. However, the alkyltriethoxysilane reduces reinforcing property of a rubber because the alkyltriethoxysilane does not form a bond between silica and a polymer, leading to reduction in fracture characteristics and deterioration in wear resistance, which may be a concern. It is considered that this is because the reacted amount of the sulfur-containing silane coupling agent is relatively reduced due to the fact that a reaction rate of the sulfur-containing silane coupling agent with the silanol group on the silica surface and a reaction rate of the alkyltriethoxysilane with the silanol group on the silica surface are the same. Therefore, in the present technology, a particular glycerol monofatty acid ester (E) is blended. The two —OH groups contained in the glycerol monofatty acid ester (E) are adsorbed to the silanol group on the surface of the silica (B), and the carbon chain of the fatty acid functions as a hydrophobic moiety, thereby enhancing dispersibility and making the silica aggregate even smaller. Such an effect may increase the surface area of the silica, thereby also increasing the number of reaction sites for the coupling agent. On the other hand, the glycerol monofatty acid ester (E) is adsorbed on the silica surface only via hydrogen bonding and thus can be desorbed, and does not inhibit the reaction of the silane coupling agent. Therefore, fracture characteristic is not deteriorated even in the presence of the alkyltriethoxysilane (D-1).

Furthermore, in spite of enhanced dispersibility of silica, the fatty acid metal salt (D-2) exhibits strong effect of plasticizing a rubber, reduces hardness, and deteriorates steering stability of a tire. That is, it is considered that the fatty acid metal salt forms an aggregate, such as a micelle, in a rubber and exhibits plasticizing effect during deformation by disintegrating this aggregate. However, if the glycerol monofatty acid ester (E) is blended in such a system, the ester coexists during the aggregation of the fatty acid metal salt, and the plasticizing effect is suppressed by inhibiting the formation of the aggregation, thereby making it possible to suppress reduction in the rubber hardness. Deterioration in processability due to blending of a large amount of silica can also be avoided.

Furthermore, although the thiuram-based vulcanization accelerator (D-3) has a problem in that the thiuram-based vulcanization accelerator (D-3) is readily adsorbed on the surface of the silica and reduces vulcanization rate, the glycerol monofatty acid ester (E) can exhibit the effect of reducing the amount of the vulcanization accelerator adsorbed on the silica surface and can suppress the reduction of vulcanization rate. Furthermore, because there is no need for increasing the amount of the vulcanization accelerator, further scorching and deterioration in bending fatigue resistance can be avoided.

In particular, if the alkyl chain of the glycerol monofatty acid ester (E) is unsaturated, the unsaturated bond serves as a reaction site for sulfur. Thus, the crosslinking density of the polymer relatively can be reduced and strength at break and elongation at break can be improved by suppression of excessive crosslinking.

DESCRIPTION OF EMBODIMENTS

The present technology will be described in further detail below.

(A) Diene Rubber

Any diene rubber that can be compounded in ordinary rubber compositions may be used as the diene rubber (A) used in the present technology. Examples thereof include natural rubber (NR), isoprene rubber (IR), butadiene rubber (BR), styrene-butadiene copolymer rubber (SBR), acrylonitrile-butadiene copolymer rubber (NBR), and the like. These may be used alone, or two or more types of these may be used in combination. Furthermore, the molecular weight and the microstructure thereof is not particularly limited. The diene rubber component may be terminally modified with an amine, amide, silyl, alkoxysilyl, carboxyl, or hydroxyl group, or the like, or may be epoxidized.

Among these diene rubbers, from a perspective of effectiveness of the present technology, SBR or BR is preferably compounded as the diene rubber component.

(B) Silica

Examples of the silica used in the present technology include any silica that is conventionally known for its use in rubber compositions, such as a dry silica, wet silica, colloidal silica, and precipitated silica. A single silica can be used alone or a combination of two or more silicas can be used.

In the present technology, from the perspective of further enhancing the effect of the present technology, the nitrogen adsorption specific surface area ($N_2SA$) of the silica is preferably from 100 to 400 m$^2$/g, and more preferably from 150 to 300 m$^2$/g. The nitrogen adsorption specific surface area ($N_2SA$) is a value calculated in accordance with JIS K6217-2.

(C) Sulfur-Containing Silane Coupling Agent

The sulfur-containing silane coupling agent used in the present technology is not limited as long as the sulfur-containing silane coupling agent can be used in a rubber composition containing silica. Examples thereof include bis-(3-triethoxysilylpropyl)tetrasulfide, bis(3-triethoxysilylpropyl)disulfide, 3-trimethoxysilylpropylbenzothiazol tetrasulfide, γ-mercaptopropyltriethoxysilane, 3-octanoylthiopropyltriethoxysilane, and the like.

(D-1) Alkyltriethoxysilane

The alkyltriethoxysilane used in the present technology is a compound represented by Formula (1) below.

Formula (1)

In Formula (1), R1 represents an alkyl group having from 1 to 20 carbons, and Et represents an ethyl group.

This is a silane compound.

Note that the alkyl group having from 1 to 20 carbons of R1 is preferably an alkyl group having from 7 to 20 carbons. Specific examples thereof include a heptyl group, an octyl group, a nonyl group, a decyl group, an undecyl group, and a dodecyl group. Among these, from the perspective of compatibility with the diene rubber, an alkyl group having from 8 to 10 carbons is more preferable, and an octyl group and a nonyl group are even more preferable.

By using the alkyltriethoxysilane (D-1), effect of suppressing aggregation of silica and increase in viscosity can be achieved.

(D-2) Fatty Acid Metal Salt

The fatty acid metal salt used in the present technology is exemplified by a metal salt of a saturated or unsaturated fatty acid having from 3 to 30 carbons. Preferred examples of the fatty acid include lauric acid, myristic acid, palmitic acid, stearic acid, oleic acid, and linoleic acid. Furthermore, examples of metals that form salts of these fatty acids include one or more metal selected from the group consisting of K, Ca, Na, Mg, Zn, Co, Ni, Ba, Fe, Al, Cu, and Mn. Of these, Zn, K and Ca are preferable.

(D-3) Thiuram-Based Vulcanization Accelerator

Examples of the thiuram-based vulcanization accelerator used in the present technology include tetramethylthiuram disulfide, tetraethylthiuram disulfide, tetrabutylthiuram disulfide, tetrabenzylthiuram disulfide, tetrakis(2-ethylhexyl) thiuram disulfide, tetramethylthiuram monosulfide, and dipentamethylenethiuram tetrasulfide. Of these, tetramethylthiuram disulfide is preferable.

(E) Glycerol Monofatty Acid Ester

The glycerol monofatty acid ester (E) used in the present technology is a monoglyceride derived from a fatty acid having from 8 to 24 carbons.

Specific examples of the fatty acid include straight-chain fatty acids, such as caprylic acid, pelargonic acid, capric acid, lauric acid, myristic acid, pentadecylic acid, palmitic acid, margaric acid, stearic acid, oleic acid, arachidic acid, behenic acid, and lignoceric acid.

One type of the glycerol monofatty acid ester may be used, or two or more types of the glycerol monofatty acid esters may be used in combination.

From the perspective of enhancing the effect of the present technology, the fatty acid is preferably stearic acid, oleic acid, linoleic acid, and/or linolenic acid.

Compounding Ratio of Rubber Composition

The rubber composition of the present technology contains:

(A) a diene rubber, (B) from 5 to 200 parts by mass of silica per 100 parts by mass of the diene rubber, (C) from 1 to 20 mass % of a sulfur-containing silane coupling agent relative to the amount of the silica, (D) (D-1) from 1 to 20 mass % of an alkyltriethoxysilane represented by Formula (1) below relative to the amount of the silica, (D-2) from 1 to 20 parts by mass of a fatty acid metal salt per 100 parts by mass of the diene rubber, or (D-3) from 0.1 to 5.0 parts by mass of a thiuram-based vulcanization accelerator per 100 parts by mass of the diene rubber, and (E) from 1 to 20 mass % of a glycerol monofatty acid ester derived from a fatty acid having from 8 to 24 carbons relative to the mass of the silica (B).

If the compounded amount of the silica (B) is less than 5 parts by mass, reinforcing property is deteriorated, and if the compounded amount is greater than 200 parts by mass, processability is deteriorated.

If the compounded amount of the sulfur-containing silane coupling agent (C) is less than 1 mass % relative to the amount of the silica (B), the effect of the present technology cannot be exhibited because the compounded amount is too small. On the other hand, if the compounded amount is greater than 20 mass %, scorching becomes worse.

If the compounded amount of the alkyltriethoxysilane (D-1) is less than 1 mass % relative to the amount of the silica (B), the effect of the present technology cannot be exhibited because the compounded amount is too small. On the other hand, if the compounded amount is greater than 20 mass %, strength at break and elongation at break are deteriorated.

If the compounded amount of the fatty acid metal salt (D-2) is less than 1 part by mass, dispersibility of silica is deteriorated. On the other hand, if the compounded amount is greater than 20 parts by mass, processability is deteriorated.

If the compounded amount of the thiuram-based vulcanization accelerator (D-3) is less than 0.1 parts by mass, the compounded amount will be too small and the effects of the present technology cannot be achieved. On the other hand, if the compounded amount is greater than 5.0 parts by mass, scorch resistance and bending fatigue resistance are deteriorated.

If the compounded amount of the glycerol monofatty acid ester (E) is less than 1 mass % relative to the amount of the silica (B), the effect of the present technology cannot be exhibited because the compounded amount is too small. On the other hand, if the compounded amount is greater than 20 mass %, strength at break and elongation at break are deteriorated.

The compounded amount of the silica (B) is more preferably from 50 to 150 parts by mass per 100 parts by mass of the diene rubber (A).

The compounded amount of the sulfur-containing silane coupling agent (C) is more preferably from 2 to 15 mass % relative to the amount of the silica (B).

The compounded amount of the alkyltriethoxysilane (D-1) is more preferably from 2 to 10 mass % relative to the amount of the silica (B).

The compounded amount of the fatty acid metal salt (D-2) is more preferably from 1 to 10 parts by mass per 100 parts by mass of the diene rubber.

The compounded amount of the thiuram-based vulcanization accelerator (D-3) is more preferably from 0.1 to 3 parts by mass per 100 parts by mass of the diene rubber (A).

The compounded amount of the glycerol monofatty acid ester (E) is more preferably from 1 to 10 mass % relative to the amount of the silica (B).

Note that, in the present technology, from the perspectives of preventing scorching of unvulcanized rubber and enhancing fracture characteristic, the compounded amount of the glycerol monofatty acid ester (E) is preferably from 10 to 1000 mass % relative to the amount of the alkyltriethoxysilane (D-1). The proportion described above is more preferably from 20 to 500 mass %.

In the present technology, to even further enhance fracture characteristic, one or more types selected from the group consisting of copolymers (1) to (3) below and hydrogenated products (4) below is preferably blended.

(1) α-pinene-aromatic vinyl copolymers (2) β-pinene-aromatic vinyl copolymers (3) copolymers of an aromatic vinyl and two or more types selected from the group consisting of α-pinene, β-pinene, and dipentene (4) hydrogenated products of the copolymers of (1) to (3) above.

Examples of the aromatic vinyl constituting the copolymers described above include styrene and α-methylstyrene, and use of styrene is preferable.

The compounded amount of the copolymer is preferably from 3 to 30 parts by weight per 100 parts by weight of the diene rubber (A).

Other Components

The rubber composition in the present technology may contain, in addition to the components described above, vulcanizing or cross-linking agents; vulcanizing or cross-linking accelerators; various fillers, such as zinc oxide, carbon black, clay, talc, and calcium carbonate; anti-aging agents; plasticizers; and other various additives commonly contained in rubber compositions. The additives are kneaded by a common method to obtain a composition that can then be used for vulcanization or cross-linking. Any conventional ordinary amount of these additives may be added to the extent that the object of the present technology is not hindered.

Furthermore, the rubber composition of the present technology is suitably used to produce a pneumatic tire according to a conventional method of producing pneumatic tires, and is preferably used in treads.

EXAMPLES

The present technology is further described in detail with reference to the examples and comparative examples described below, but the present technology is not limited by these examples.

Standard Example 1, Examples 1 and 2, and Comparative Examples 1 to 7

Preparation of Samples

For the composition (part by mass) shown in Table 1, the components other than the vulcanization accelerators and sulfur were kneaded for 5 minutes in a 1.7-liter sealed Banbury mixer. The kneaded material was discharged outside the mixer to be cooled, and the vulcanization accelerators and sulfur were then added to the mixture in the same Banbury mixer and further kneaded to obtain a rubber composition. Thereafter, the obtained rubber composition was pressure-vulcanized in a predetermined mold at 160° C. for 20 minutes to obtain a vulcanized rubber test sample, and then the physical properties of the unvulcanized rubber composition and the vulcanized rubber test sample were measured by the test methods described below.

Mooney viscosity: The Mooney viscosity of the unvulcanized rubber at 100° C. was measured in accordance with JIS K 6300. The result was expressed as an index value with the value of Standard Example 1 expressed as an index value of 100. A smaller value indicates a lower viscosity and thus indicates superior processability.

Mooney scorch: The Mooney scorch was tested at 125° C. in accordance with JIS K 6300. The result was expressed as an index value with the value of Standard Example 1 expressed as an index value of 100. A larger value indicates superior scorch resistance.

Strength at break: The strength at break was tested at room temperature in accordance with JIS K 6251. The result was expressed as an index value with the value of Standard Example 1 expressed as an index value of 100. A larger value indicates superior reinforcing property.

Elongation at break: The elongation at break was tested at room temperature in accordance with JIS K 6251. The result was expressed as an index value with the value of Standard Example 1 expressed as an index value of 100. A larger value indicates superior wear resistance.

The results are shown in Table 1.

TABLE 1

|  | Standard Example 1 | Comparative Example 1 | Example 1 | Comparative Example 2 | Comparative Example 3 |
|---|---|---|---|---|---|
| SBR *1 | 110.0 | 110.0 | 110.0 | 110.0 | 110.0 |
| BR *2 | 20.0 | 20.0 | 20.0 | 20.0 | 20.0 |
| Silica *3 | 90.0 | 90.0 | 90.0 | 90.0 | 90.0 |
| Carbon black *4 | 5.0 | 5.0 | 5.0 | 5.0 | 5.0 |
| Silane coupling agent *5 | 7.2 | 7.2 | 7.2 | 7.2 | 13.2 |
| Alkyltriethoxysilane *6 | — | 2.7 | 2.7 | — | — |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 20.0 | 20.0 | 20.0 | 20.0 | 20.0 |
| Compound-1 *11 | — | — | 6.0 | 6.0 | — |
| Compound-2 *12 | — | — | — | — | — |
| Compound-3 *13 | — | — | — | — | — |
| Compound-4 *14 | — | — | — | — | — |
| Sulfur *15 | 1.4 | 1.4 | 1.4 | 1.4 | 1.4 |
| Vulcanization accelerator-1 *16 | 1.7 | 1.7 | 1.7 | 1.7 | 1.7 |
| Vulcanization accelerator-2 *17 | 0.4 | 0.4 | 0.4 | 0.4 | 0.4 |
| Measurement results |  |  |  |  |  |
| Mooney viscosity | 100 | 90 | 80 | 105 | 80 |
| Mooney scorch | 100 | 100 | 105 | 100 | 75 |
| Breaking strength | 100 | 95 | 105 | 110 | 110 |
| Elongation at break | 100 | 105 | 110 | 110 | 90 |

|  | Comparative Example 4 | Comparative Example 5 | Example 2 | Comparative Example 6 | Comparative Example 7 |
|---|---|---|---|---|---|
| SBR *1 | 110.0 | 110.0 | 110.0 | 110.0 | 110.0 |
| BR *2 | 20.0 | 20.0 | 20.0 | 20.0 | 20.0 |
| Silica *3 | 90.0 | 90.0 | 90.0 | 90.0 | 90.0 |
| Carbon black *4 | 5.0 | 5.0 | 5.0 | 5.0 | 5.0 |
| Silane coupling agent *5 | — | — | 7.2 | 7.2 | 7.2 |
| Alkyltriethoxysilane *6 | 7.2 | — | 2.7 | 2.7 | 2.7 |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 20.0 | 20.0 | 20.0 | 20.0 | 20.0 |
| Compound-1 *11 | 6.0 | 13.2 | — | — | — |
| Compound-2 *12 | — | — | 6.0 | — | — |
| Compound-3 *13 | — | — | — | 6.0 | — |
| Compound-4 *14 | — | — | — | — | 6.0 |
| Sulfur *15 | 1.4 | 1.4 | 1.4 | 1.4 | 1.4 |
| Vulcanization accelerator-1 *16 | 1.7 | 1.7 | 1.7 | 1.7 | 1.7 |
| Vulcanization accelerator-2 *17 | 0.4 | 0.4 | 0.4 | 0.4 | 0.4 |
| Measurement results |  |  |  |  |  |
| Mooney viscosity | 110 | 120 | 75 | 100 | 100 |
| Mooney scorch | 150 | 195 | 110 | 80 | 100 |

TABLE 1-continued

| | | | | | |
|---|---|---|---|---|---|
| Breaking strength | 60 | 50 | 110 | 105 | 90 |
| Elongation at break | 180 | 190 | 120 | 95 | 105 |

*1: SBR (Tufdene 3830, manufactured by Asahi Kasei Corporation; oil extender content = 37.5 parts by mass per 100 parts by mass of SBR)
*2: BR (Nipol BR1220, manufactured by Zeon Corporation)
*3: Silica (Zeosil 1165MP, manufactured by Rhodia; nitrogen adsorption specific surface area ($N_2SA$) = 165 $m^2/g$)
*4: Carbon black (Sho Black N339, manufactured by Cabot Japan K.K.; nitrogen adsorption specific surface area ($N_2SA$) = 90 $m^2/g$)
*5: Silane coupling agent (Si69, manufactured by Evonik Degussa; bis(3-triethoxysilylpropyl)tetrasulfide)
*6: Alkyltriethoxysilane (KBE-3083, manufactured by Shin-Etsu Chemical Co., Ltd.; n-octyltriethoxysilane)
*7: Zinc oxide (Zinc Oxide III, manufactured by Seido Chemical Industry Co., Ltd.)
*8: Stearic acid (Stearic Acid YR, manufactured by NOF Corp.)
*9: Anti-aging agent (Santoflex 6PPD, manufactured by Solutia Europe)
*10: Process oil (Extract No. 4S, manufactured by Showa Shell Sekiyu K.K.)
*11: Compound-1 (glycerol monostearate, manufactured by Sigma-Aldrich Co. LLC.)
*12: Compound-2 (glycerol monooleate, manufactured by Sigma-Aldrich Co. LLC.)
*13: Compound-3 (glycerin, manufactured by Sigma-Aldrich Co. LLC.)
*14: Compound-4 (glyceryl tristearate, manufactured by Sigma-Aldrich Co. LLC.)
*15: Sulfur (oil-treated sulfur, manufactured by Karuizawa Refinery Ltd.)
*16: Vulcanization accelerator-1 (Nocceler CZ-G, manufactured by Ouchi Shinko Chemical Industrial Co., Ltd.)
*17: Vulcanization accelerator-2 (Perkacit DPG, manufactured by Flexsys)

As is clear from the results shown in Table 1 above, for the rubber compositions obtained in Examples 1 and 2, in which, to the diene rubber (A), particular amounts of the silica (B), the sulfur-containing silane coupling agent (C), the alkyltriethoxysilane (D-1) and the particular glycerol monofatty acid ester (E) were compounded, higher dispersibility of the silica (B) was achieved, the fracture characteristic was improved, and the problem of scorching due to sulfur was prevented, compared to the case of Standard Example 1, in which no (D) and (E) described above were contained.

Comparative Example 1, which was an example where the alkyltriethoxysilane (D-1) was blended in the rubber composition described in Standard Example 1, exhibited deterioration in the strength at break.

Comparative Example 2, which was an example where the glycerol monofatty acid ester (E) was blended in the rubber composition described in Standard Example 1, exhibited deterioration in the Mooney viscosity.

Comparative Example 3, which was an example where the amount of the sulfur-containing silane coupling agent (C) in the rubber composition described in Standard Example 1 was increased, exhibited deterioration in the elongation at break and scorching.

Because Comparative Example 4 did not contain the sulfur-containing silane coupling agent (C), the strength at break and the Mooney viscosity were deteriorated.

Comparative Example 5, which was an example where no sulfur-containing silane coupling agent (C) and no alkyltriethoxysilane (D-1) were contained and the amount of the glycerol monofatty acid ester (E) was increased, exhibited deterioration in the strength at break and the Mooney viscosity.

Comparative Example 6, which was an example where no glycerol monofatty acid ester (E) was blended but glycerin was blended in place of the glycerol monofatty acid ester (E), exhibited deterioration in the elongation at break and scorching.

Comparative Example 7, which was an example where no glycerol monofatty acid ester (E) was blended but glyceryl tristearate was blended in place of the glycerol monofatty acid ester (E), exhibited deterioration in the strength at break.

Examples 3 to 7 and Comparative Examples 8 to 11

The examples described above were repeated except for changing the compounded amount of the glycerol monofatty acid ester (E) relative to the amount of the silica (B). The results are shown in Table 2. Note that the results for Standard Example 1, Example 1, and Comparative Example 1, which were also shown above, are also shown together in Table 2.

Examples 8 and 9 and Comparative Example 12

In the systems where a resin was added, the effect of blending the glycerol monofatty acid ester (E) was studied. Except for this, the examples described above were repeated. The results are shown in Table 2.

TABLE 2

| | Standard Example 1 | Comparative Example 1 | Comparative Example 8 | Example 3 | Example 1 |
|---|---|---|---|---|---|
| SBR *1 | 110.0 | 110.0 | 110.0 | 110.0 | 110.0 |
| BR *2 | 20.0 | 20.0 | 20.0 | 20.0 | 20.0 |
| Silica *3 | 90.0 | 90.0 | 90.0 | 90.0 | 90.0 |
| Carbon black *4 | 5.0 | 5.0 | 5.0 | 5.0 | 5.0 |
| Silane coupling agent *5 | 7.2 | 7.2 | 7.2 | 7.2 | 7.2 |
| Alkyltriethoxysilane *6 | — | 2.7 | 2.7 | 2.7 | 2.7 |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 20.0 | 20.0 | 20.0 | 20.0 | 20.0 |
| Compound-1 *11 | — | — | 0.1 | 1.0 | 6.0 |
| Proportion of compound-1 relative to silica (mass %) | — | — | 0.1 | 1.1 | 6.7 |

TABLE 2-continued

|  | | | | | |
|---|---|---|---|---|---|
| Compound-2 *12 | — | — | — | — | — |
| Proportion of compound-2 relative to silica (mass %) | — | — | — | — | — |
| Resin | — | — | — | — | — |
| Sulfur *15 | 1.4 | 1.4 | 1.4 | 1.4 | 1.4 |
| Vulcanization accelerator-1 *16 | 1.7 | 1.7 | 1.7 | 1.7 | 1.7 |
| Vulcanization accelerator-2 *17 | 0.4 | 0.4 | 0.4 | 0.4 | 0.4 |
| Measurement results | | | | | |
| Mooney viscosity | 100 | 90 | 90 | 85 | 80 |
| Mooney scorch | 100 | 100 | 100 | 100 | 105 |
| Breaking strength | 100 | 95 | 95 | 100 | 105 |
| Elongation at break | 100 | 105 | 105 | 105 | 110 |

|  | Example 4 | Comparative Example 9 | Comparative Example 10 | Example 5 | Example 6 |
|---|---|---|---|---|---|
| SBR *1 | 110.0 | 110.0 | 110.0 | 110.0 | 110.0 |
| BR *2 | 20.0 | 20.0 | 20.0 | 20.0 | 20.0 |
| Silica *3 | 90.0 | 90.0 | 90.0 | 90.0 | 90.0 |
| Carbon black *4 | 5.0 | 5.0 | 5.0 | 5.0 | 5.0 |
| Silane coupling agent *5 | 7.2 | 7.2 | 7.2 | 7.2 | 7.2 |
| Alkyltriethoxysilane *6 | 2.7 | 2.7 | 2.7 | 2.7 | 2.7 |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 20.0 | 20.0 | 20.0 | 20.0 | 20.0 |
| Compound-1 *11 | 10.0 | 30.0 | — | — | — |
| Proportion of compound-1 relative to silica (mass %) | 11.1 | 33.3 | — | — | — |
| Compound-2 *12 | — | — | 0.1 | 1.0 | 6.0 |
| Proportion of compound-2 relative to silica (mass %) | — | — | 0.1 | 1.1 | 6.7 |
| Resin | — | — | — | — | — |
| Sulfur *15 | 1.4 | 1.4 | 1.4 | 1.4 | 1.4 |
| Vulcanization accelerator-1 *16 | 1.7 | 1.7 | 1.7 | 1.7 | 1.7 |
| Vulcanization accelerator-2 *17 | 0.4 | 0.4 | 0.4 | 0.4 | 0.4 |
| Measurement results | | | | | |
| Mooney viscosity | 75 | 65 | 90 | 80 | 75 |
| Mooney scorch | 115 | 130 | 100 | 105 | 110 |
| Breaking strength | 105 | 85 | 95 | 105 | 110 |
| Elongation at break | 125 | 140 | 105 | 110 | 115 |

|  | Example 7 | Comparative Example 11 | Comparative Example 12 | Example 8 | Example 9 |
|---|---|---|---|---|---|
| SBR *1 | 110.0 | 110.0 | 110.0 | 110.0 | 110.0 |
| BR *2 | 20.0 | 20.0 | 20.0 | 20.0 | 20.0 |
| Silica *3 | 90.0 | 90.0 | 90.0 | 90.0 | 90.0 |
| Carbon black *4 | 5.0 | 5.0 | 5.0 | 5.0 | 5.0 |
| Silane coupling agent *5 | 7.2 | 7.2 | 7.2 | 7.2 | 7.2 |
| Alkyltriethoxysilane *6 | 2.7 | 2.7 | 2.7 | 2.7 | 2.7 |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 20.0 | 20.0 | 20.0 | 20.0 | 20.0 |
| Compound-1 *11 | — | — | — | 6.0 | — |
| Proportion of compound-1 relative to silica (mass %) | — | — | — | 6.7 | — |
| Compound-2 *12 | 10.0 | 30.0 | — | — | 6.0 |
| Proportion of compound-2 relative to silica (mass %) | 11.1 | 33.3 | — | — | 6.7 |
| Resin | — | — | 10.0 | 10.0 | 10.0 |
| Sulfur *15 | 1.4 | 1.4 | 1.4 | 1.4 | 1.4 |
| Vulcanization accelerator-1 *16 | 1.7 | 1.7 | 1.7 | 1.7 | 1.7 |
| Vulcanization accelerator-2 *17 | 0.4 | 0.4 | 0.4 | 0.4 | 0.4 |
| Measurement results | | | | | |
| Mooney viscosity | 70 | 45 | 105 | 75 | 65 |
| Mooney scorch | 120 | 145 | 100 | 105 | 115 |
| Breaking strength | 115 | 90 | 105 | 110 | 115 |
| Elongation at break | 140 | 170 | 95 | 110 | 125 |

Resin: (terpene styrene resin TO-125, manufactured by Yasuhara Chemical Co., Ltd.)

As is clear from the results shown in Table 2, for Comparative Examples 1, 8, and 10, the strength at break was deteriorated because Comparative Examples 1, 8, and 10 did not contain the glycerol monofatty acid ester (E) or contained the glycerol monofatty acid ester (E) in a compounded amount that is less than the lower limit specified in the present technology.

On the other hand, in Examples 3 and 5, the compounded amount of the glycerol monofatty acid ester (E) was within the range specified in the present technology, and the Mooney viscosity and the elongation at break were enhanced without worsening scorching. Examples 4, 6, and 7 were examples where the compounded amount of the glycerol monofatty acid ester (E) was increased, and the physical properties thereof were further enhanced.

Because the compounded amount of the glycerol monofatty acid ester (E) was greater than the upper limit specified in the present technology in Comparative Examples 9 and 11, the strength at break was deteriorated.

Comparative Example 12, which was an example where no glycerol monofatty acid ester (E) was blended but a resin was blended, exhibited deterioration in the elongation at break and the Mooney viscosity.

On the other hand, in Examples 8 and 9, the glycerol monofatty acid ester (E) was blended in an amount within the range specified in the present technology, all the physical properties were enhanced compared to the results of Comparative Example 12.

Examples 10 to 15 and Comparative Examples 13 to 16

The examples described above were repeated except for changing the compounded amount of the glycerol monofatty acid ester (E) relative to the amount of the alkyltriethoxysilane (D-1). The results are shown in Table 3. Note that the results for Standard Example 1, which was also shown above, is also shown together in Table 3.

TABLE 3

|  | Standard Example 1 | Example 10 | Example 11 | Example 12 | Comparative Example 13 | Comparative Example 14 |
|---|---|---|---|---|---|---|
| SBR *1 | 110.0 | 110.0 | 110.0 | 110.0 | 110.0 | 110.0 |
| BR *2 | 20.0 | 20.0 | 20.0 | 20.0 | 20.0 | 20.0 |
| Silica *3 | 90.0 | 90.0 | 90.0 | 90.0 | 90.0 | 90.0 |
| Carbon black *4 | 5.0 | 5.0 | 5.0 | 5.0 | 5.0 | 5.0 |
| Silane coupling agent *5 | 7.2 | 7.2 | 7.2 | 7.2 | 7.2 | 7.2 |
| Alkyltriethoxysilane *6 | — | 1.0 | 4.0 | 5.0 | 0.1 | 5.9 |
| Zinc oxide *7 | 3.0 | 3.0 | 3.0 | 3.0 | 3.0 | 3.0 |
| Stearic acid *8 | 2.0 | 2.0 | 2.0 | 2.0 | 2.0 | 2.0 |
| Anti-aging agent *9 | 1.5 | 1.5 | 1.5 | 1.5 | 1.5 | 1.5 |
| Process oil *10 | 20.0 | 20.0 | 20.0 | 20.0 | 20.0 | 20.0 |
| Compound-1 *11 | 6.0 | 5.0 | 2.0 | 1.0 | 5.9 | 0.1 |
| Proportion of compound-1 relative to alkyltriethoxysilane (mass %) | — | 500 | 50 | 20 | 5900 | 2 |
| Compound-2 *12 | — | — | — | — | — | — |
| Proportion of compound-2 relative to alkyltriethoxysilane (mass %) | — | — | — | — | — | — |
| Sulfur *15 | 1.4 | 1.4 | 1.4 | 1.4 | 1.4 | 1.4 |
| Vulcanization accelerator-1 *16 | 1.7 | 1.7 | 1.7 | 1.7 | 1.7 | 1.7 |
| Vulcanization accelerator-2 *17 | 0.4 | 0.4 | 0.4 | 0.4 | 0.4 | 0.4 |
| Measurement results |  |  |  |  |  |  |
| Mooney viscosity | 100 | 100 | 100 | 95 | 105 | 95 |
| Mooney scorch | 100 | 100 | 100 | 105 | 100 | 100 |
| Breaking strength | 100 | 110 | 105 | 100 | 100 | 95 |
| Elongation at break | 100 | 105 | 105 | 105 | 100 | 100 |

|  | Example 13 | Example 14 | Example 15 | Comparative Example 15 | Comparative Example 16 |
|---|---|---|---|---|---|
| SBR *1 | 110.0 | 110.0 | 110.0 | 110.0 | 110.0 |
| BR *2 | 20.0 | 20.0 | 20.0 | 20.0 | 20.0 |
| Silica *3 | 90.0 | 90.0 | 90.0 | 90.0 | 90.0 |
| Carbon black *4 | 5.0 | 5.0 | 5.0 | 5.0 | 5.0 |
| Silane coupling agent *5 | 7.2 | 7.2 | 7.2 | 7.2 | 7.2 |
| Alkyltriethoxysilane *6 | 1.0 | 4.0 | 5.0 | 0.1 | 5.9 |
| Zinc oxide *7 | 3.0 | 3.0 | 3.0 | 3.0 | 3.0 |
| Stearic acid *8 | 2.0 | 2.0 | 2.0 | 2.0 | 2.0 |
| Anti-aging agent *9 | 1.5 | 1.5 | 1.5 | 1.5 | 1.5 |
| Process oil *10 | 20.0 | 20.0 | 20.0 | 20.0 | 20.0 |
| Compound-1 *11 | — | — | — | — | — |
| Proportion of compound-1 relative to alkyltriethoxysilane (mass %) | — | — | — | — | — |
| Compound-2 *12 | 5.0 | 2.0 | 1.0 | 5.9 | 0.1 |
| Proportion of compound-2 relative to alkyltriethoxysilane (mass %) | 500 | 50 | 20 | 5900 | 2 |
| Sulfur *15 | 1.4 | 1.4 | 1.4 | 1.4 | 1.4 |
| Vulcanization accelerator-1 *16 | 1.7 | 1.7 | 1.7 | 1.7 | 1.7 |
| Vulcanization accelerator-2 *17 | 0.4 | 0.4 | 0.4 | 0.4 | 0.4 |
| Measurement results |  |  |  |  |  |

TABLE 3-continued

| | | | | | |
|---|---|---|---|---|---|
| Mooney viscosity | 95 | 90 | 90 | 105 | 100 |
| Mooney scorch | 105 | 105 | 110 | 105 | 100 |
| Breaking strength | 115 | 115 | 105 | 95 | 95 |
| Elongation at break | 120 | 110 | 115 | 95 | 95 |

As is clear from the results shown in Table 3, in Examples 10 to 15, because the compounded amount of the glycerol monofatty acid ester (E) was within the range of 10 to 1000 mass % relative to the amount of the alkyltriethoxysilane (D-1), various physical properties were enhanced.

Comparative Examples 13 and 15, in which the compounded amount of the alkyltriethoxysilane (D-1) was less than the lower limit specified in the present technology, exhibited deterioration of the Mooney viscosity and no enhancement in other physical properties.

Comparative Examples 14 and 16, in which the compounded amount of the glycerol monofatty acid ester (E) was less than the lower limit specified in the present technology and the compounded amount of the glycerol monofatty acid ester (E) was approximately 2 mass % relative to the amount of the alkyltriethoxysilane (D-1), exhibited deterioration in the strength at break.

Standard Example 2, Examples 16 to 24, and Comparative Examples 17 to 24

Preparation of Samples

For the composition (part by mass) shown in Table 4, the components other than the vulcanization accelerators and sulfur were kneaded for 5 minutes in a 1.7-liter sealed Banbury mixer. The rubber was then discharged outside of the mixer and cooled at room temperature. Thereafter, the rubber was placed in the same mixer again, and the vulcanization accelerators and sulfur were then added to the mixture and further kneaded to obtain a rubber composition. Thereafter, the obtained rubber composition was pressure-vulcanized in a predetermined mold at 160° C. for 20 minutes to obtain a vulcanized rubber test sample, and then the physical properties of the unvulcanized rubber composition and the vulcanized rubber test sample were measured by the test methods described below.

Mooney viscosity: Using the rubber composition above, viscosity of the unvulcanized rubber at 100° C. was measured in accordance with JIS K 6300. The result was expressed as an index value with the value of Standard Example 2 expressed as an index value of 100. A smaller index indicates a lower viscosity and thus indicates superior processability. Furthermore, after the rubber composition was prepared, the rubber composition was stored at room temperature for 1 week, and then the Mooney viscosity described above was measured using this rubber composition.

Tire rolling resistance: The tire rolling resistance was tested at 80 km/h in accordance with JIS D 4324:2009 and conditions for passenger vehicles. The result was expressed as an index value with the value of Standard Example 2 expressed as an index value of 100. A smaller index value indicates lower rolling resistance.

Tire steering stability: An actual car in which the vulcanized rubber test piece was incorporated in the tread was prepared to perform sensory evaluation by a test driver. The evaluation was performed based on the evaluation criteria described below. A: Excellent, B: Good, and C: Acceptable.

Payne effect: G' (0.56% strain) was measured using the unvulcanized composition and using RPA 2000 in accordance with ASTM P6204. The result was expressed as an index value with the value of Standard Example 2 expressed as an index value of 100. A smaller index value indicates higher dispersibility of silica.

The results are shown in Table 4.

TABLE 4

| | Standard Example 2 | Comparative Example 17 | Example 16 | Comparative Example 18 | Example 17 | Example 18 |
|---|---|---|---|---|---|---|
| SBR *18 | 110.0 | 110.0 | 110.0 | 110.0 | 110.0 | 110.0 |
| BR *19 | 20.0 | 20.0 | 20.0 | 20.0 | 20.0 | 20.0 |
| Silica *20 | 90.0 | 90.0 | 90.0 | 90.0 | 90.0 | 90.0 |
| Carbon black *21 | 5.0 | 5.0 | 5.0 | 5.0 | 5.0 | 5.0 |
| Silane coupling agent *22 | 7.2 | 7.2 | 7.2 | 7.2 | 7.2 | 7.2 |
| Zinc oxide *23 | 3.0 | 3.0 | 3.0 | 3.0 | 3.0 | 3.0 |
| Stearic acid *24 | 2.0 | 2.0 | 2.0 | 2.0 | 2.0 | 2.0 |
| Anti-aging agent *25 | 1.5 | 1.5 | 1.5 | 1.5 | 1.5 | 1.5 |
| Process oil *26 | 10.0 | 10.0 | 10.0 | 10.0 | 10.0 | 10.0 |
| Zinc stearate *27-1 | | 4.0 | 4.0 | | | |
| Potassium stearate *27-2 | | | | | 4.0 | |
| Calcium stearate *27-3 | | | | | | 4.0 |
| Sodium stearate *27-4 | | | | | | |
| Magnesium stearate *27-5 | | | | | | |
| Glycerol monofatty acid ester-1 *28-1 | | | 4.0 | 4.0 | 4.0 | 4.0 |
| Glycerol monofatty acid ester-2 *28-2 | | | | | | |
| Glycerol monofatty acid ester-3 *28-3 | | | | | | |
| Fatty acid ester for comparison-1 *29-1 | | | | | | |
| Fatty acid ester for comparison-2 *29-2 | | | | | | |
| Sulfur *30 | 2.0 | 2.0 | 2.0 | 2.0 | 2.0 | 2.0 |
| Vulcanization accelerator-1 *31 | 1.7 | 1.7 | 1.7 | 1.7 | 1.7 | 1.7 |
| Vulcanization accelerator-2 *32 | 0.4 | 0.4 | 0.4 | 0.4 | 0.4 | 0.4 |
| Measurement results | | | | | | |
| Mooney viscosity | 100 | 90 | 80 | 105 | 70 | 75 |

TABLE 4-continued

|  | | | | | | |
|---|---|---|---|---|---|---|
| Tire rolling resistance | 100 | 100 | 90 | 95 | 90 | 85 |
| Tire steering stability | B | C | A | A | A | A |
| Payne effect | 100 | 100 | 80 | 85 | 75 | 75 |

|  | Example 19 | Example 20 | Example 21 | Example 22 | Comparative Example 19 | Comparative Example 20 |
|---|---|---|---|---|---|---|
| SBR *18 | 110.0 | 110.0 | 110.0 | 110.0 | 110.0 | 110.0 |
| BR *19 | 20.0 | 20.0 | 20.0 | 20.0 | 20.0 | 20.0 |
| Silica *20 | 90.0 | 90.0 | 90.0 | 90.0 | 90.0 | 90.0 |
| Carbon black *21 | 5.0 | 5.0 | 5.0 | 5.0 | 5.0 | 5.0 |
| Silane coupling agent *22 | 7.2 | 7.2 | 7.2 | 7.2 | 7.2 | 7.2 |
| Zinc oxide *23 | 3.0 | 3.0 | 3.0 | 3.0 | 3.0 | 3.0 |
| Stearic acid *24 | 2.0 | 2.0 | 2.0 | 2.0 | 2.0 | 2.0 |
| Anti-aging agent *25 | 1.5 | 1.5 | 1.5 | 1.5 | 1.5 | 1.5 |
| Process oil *26 | 10.0 | 10.0 | 10.0 | 10.0 | 10.0 | 10.0 |
| Zinc stearate *27-1 |  |  | 4.0 | 4.0 | 4.0 | 4.0 |
| Potassium stearate *27-2 |  |  |  |  |  |  |
| Calcium stearate *27-3 |  |  |  |  |  |  |
| Sodium stearate *27-4 | 4.0 |  |  |  |  |  |
| Magnesium stearate *27-5 |  | 4.0 |  |  |  |  |
| Glycerol monofatty acid ester-1 *28-1 | 4.0 | 4.0 |  |  |  |  |
| Glycerol monofatty acid ester-2 *28-2 |  |  | 4.0 |  |  |  |
| Glycerol monofatty acid ester-3 *28-3 |  |  |  | 4.0 |  |  |
| Fatty acid ester for comparison-1 *29-1 |  |  |  |  | 4.0 |  |
| Fatty acid ester for comparison-2 *29-2 |  |  |  |  |  | 4.0 |
| Sulfur *30 | 2.0 | 2.0 | 2.0 | 2.0 | 2.0 | 2.0 |
| Vulcanization accelerator-1 *31 | 1.7 | 1.7 | 1.7 | 1.7 | 1.7 | 1.7 |
| Vulcanization accelerator-2 *32 | 0.4 | 0.4 | 0.4 | 0.4 | 0.4 | 0.4 |
| Measurement results |  |  |  |  |  |  |
| Mooney viscosity | 80 | 75 | 75 | 50 | 110 | 80 |
| Tire rolling resistance | 90 | 90 | 85 | 90 | 110 | 100 |
| Tire steering stability | A | A | A | A | C | B |
| Payne effect | 80 | 80 | 75 | 70 | 110 | 105 |

|  | Comparative Example 21 | Example 23 | Comparative Example 22 | Comparative Example 23 | Example 24 | Comparative Example 24 |
|---|---|---|---|---|---|---|
| SBR *18 | 110.0 | 110.0 | 110.0 | 110.0 | 110.0 | 110.0 |
| BR *19 | 20.0 | 20.0 | 20.0 | 20.0 | 20.0 | 20.0 |
| Silica *20 | 90.0 | 90.0 | 90.0 | 90.0 | 90.0 | 90.0 |
| Carbon black *21 | 5.0 | 5.0 | 5.0 | 5.0 | 5.0 | 5.0 |
| Silane coupling agent *22 | 7.2 | 7.2 | 7.2 | 7.2 | 7.2 | 7.2 |
| Zinc oxide *23 | 3.0 | 3.0 | 3.0 | 3.0 | 3.0 | 3.0 |
| Stearic acid *24 | 2.0 | 2.0 | 2.0 | 2.0 | 2.0 | 2.0 |
| Anti-aging agent *25 | 1.5 | 1.5 | 1.5 | 1.5 | 1.5 | 1.5 |
| Process oil *26 | 10.0 | 10.0 | 10.0 | 10.0 | 10.0 | 10.0 |
| Zinc stearate *27-1 | 0.1 | 8.0 | 22.0 | 4.0 | 4.0 | 4.0 |
| Potassium stearate *27-2 |  |  |  |  |  |  |
| Calcium stearate *27-3 |  |  |  |  |  |  |
| Sodium stearate *27-4 |  |  |  |  |  |  |
| Magnesium stearate *27-5 |  |  |  |  |  |  |
| Glycerol monofatty acid ester-1 *28-1 | 4.0 | 4.0 | 4.0 | 0.1 | 10.0 | 20.0 |
| Glycerol monofatty acid ester-2 *28-2 |  |  |  |  |  |  |
| Glycerol monofatty acid ester-3 *28-3 |  |  |  |  |  |  |
| Fatty acid ester for comparison-1 *29-1 |  |  |  |  |  |  |
| Fatty acid ester for comparison-2 *29-2 |  |  |  |  |  |  |
| Sulfur *30 | 2.0 | 2.0 | 2.0 | 2.0 | 2.0 | 2.0 |
| Vulcanization accelerator-1 *31 | 1.7 | 1.7 | 1.7 | 1.7 | 1.7 | 1.7 |
| Vulcanization accelerator-2 *32 | 0.4 | 0.4 | 0.4 | 0.4 | 0.4 | 0.4 |
| Measurement results |  |  |  |  |  |  |
| Mooney viscosity | 105 | 65 | 45 | 90 | 95 | 115 |
| Tire rolling resistance | 95 | 90 | 90 | 100 | 85 | 110 |
| Tire steering stability | A | B | C | C | A | A |
| Payne effect | 85 | 75 | 50 | 100 | 75 | 60 |

*18: SBR (Tufdene 3830, manufactured by Asahi Kasei Corporation; oil extender content = 37.5 parts by mass per 100 parts by mass of SBR)
*19: BR (Nipol BR1220, manufactured by Zeon Corporation)
*20: Silica (Zeosil 1165GR, manufactured by Rhodia; nitrogen adsorption specific surface area ($N_2SA$) = 165 $m^2/g$)
*21: Carbon black (Sho Black N339, manufactured by Cabot Japan K.K.; nitrogen adsorption specific surface area ($N_2SA$) = 90 $m^2/g$)
*22: Silane coupling agent (Si69, manufactured by Evonik Degussa; bis(3-triethoxysilylpropyl)tetrasulfide)
*23: Zinc oxide (Zinc Oxide III, manufactured by Seido Chemical Industry Co., Ltd.)
*24: Stearic acid (Beads Stearic Acid YR, manufactured by NOF Corporation)
*25: Anti-aging agent (Santoflex 6PPD, manufactured by Solutia Europe)
*26: Process oil (Extract No. 4S, manufactured by Showa Shell Sekiyu K.K.)
*27-1: Zinc stearate (manufactured by Tokyo Chemical Industry Co., Ltd.)
*27-2: Potassium stearate
*27-3: Calcium stearate
*27-4: Sodium stearate
*27-5: Magnesium stearate TABLE 4-continued

*28-1: Glycerol monofatty acid ester-1 (glycerol monostearate, manufactured by Sigma-Aldrich Co. LLC.)
*28-2: Glycerol monofatty acid ester-2 (glycerol monooleate)
*28-3: Glycerol monofatty acid ester-3 (glycerol monobehenate)
*29-1: Fatty acid ester for comparison-1 (glycerin, manufactured by Sigma-Aldrich Co. LLC.)
*29-2: Fatty acid ester for comparison-2 (glycerol monobutyrate)
*30: Sulfur (oil-treated sulfur, manufactured by Karuizawa Refinery Ltd.)
*31: Vulcanization accelerator-1 (Nocceler CZ-G, manufactured by Ouchi Shinko Chemical Industrial Co., Ltd.)
*32: Vulcanization accelerator-2 (Perkacit DPG, manufactured by Flexsys)

As is clear from the results shown in Table 4 above, the comparison between Standard Example 2 and Comparative Example 17 shows that, for the composition of Comparative Example 17, although the processability was enhanced, the hardness was decreased and the tire steering stability was deteriorated because the processing aid formed from zinc stearate was blended.

On the other hand, because Examples 16 to 24 contained, in the diene rubber, particular amounts of the silica having the particular specific surface area, the silane coupling agent, the particular glycerol monofatty acid ester and the fatty acid metal salt, Examples 16 to 24 exhibited excellent processability and excellent low rolling resistance due to the high dispersibility of silica. Furthermore, reduction in hardness was suppressed, and thus excellent tire steering stability was ensured.

Because Comparative Example 18 did not contain the fatty acid metal salt, the processability was deteriorated.

Comparative example 19, which was an example where glycerin was used in place of the glycerol monofatty acid ester, exhibited deterioration in the processability and the rolling resistance, and no improvement was observed in the tire steering stability.

Comparative Example 20, which was an example that used glycerol monobutyrate, exhibited deterioration in the Payne effect. Furthermore, no improvement was observed in the rolling resistance and the tire steering stability.

In Comparative Example 21, because the compounded amount of the fatty acid metal salt was less than the lower limit specified in the present technology, the processability was deteriorated.

In Comparative Example 22, because the compounded amount of the fatty acid metal salt was greater than the upper limit specified in the present technology, no improvement was observed in the tire steering stability.

In Comparative Example 23, because the compounded amount of the glycerol monofatty acid ester was less than the lower limit specified in the present technology, no improvement was observed in the rolling resistance, the tire steering stability, and the Payne effect.

In Comparative Example 24, because the compounded amount of the glycerol monofatty acid ester was greater than the upper limit specified in the present technology, the processability and the rolling resistance were deteriorated.

Standard Example 3, Examples 25 and 26, and Comparative Examples 25 to 35

Preparation of Samples

For the composition (part by mass) shown in Tables 5 and 6, the components other than the vulcanization accelerators and sulfur were kneaded for 5 minutes in a 1.7-liter sealed Banbury mixer. The rubber was then discharged outside of the mixer and cooled at room temperature. Thereafter, the rubber was placed in the same mixer again, and the vulcanization accelerators and sulfur were then added to the mixture and further kneaded to obtain a rubber composition. Thereafter, the obtained rubber composition was pressure-vulcanized in a predetermined mold at 160° C. for 20 minutes to obtain a vulcanized rubber test sample, and then the physical properties of the unvulcanized rubber composition and the vulcanized rubber test sample were measured by the test methods described below.

Vulcanization rate: The time required to reach the vulcanization degree of 95% (T95, min) was measured at 160° C. using an oscillating disc curemeter at an amplitude of 1 degree in accordance with JIS 6300. The result was expressed as an index value with the value of Standard Example 3 expressed as an index value of 100. A smaller value indicates higher vulcanization rate and excellent productivity.

Bending fatigue resistance: Strain was repeatedly applied to a JIS No. 3 dumbbell-shaped sample at a strain factor of 60% in accordance with JIS K 6251, and the number of times until the break of the sample was measured. The result was expressed as an index value with the value of Standard Example 3 expressed as an index value of 100. A larger index value indicates superior bending fatigue resistance.

Hardness: The hardness was tested at 20° C. in accordance with JIS K 6253. The result was expressed as an index value with the value of Standard Example 3 expressed as an index value of 100. A larger index value indicates higher hardness.

tan δ (60° C.): The tan δ (60° C.) was tested at 60° C. in accordance with JIS K 6394. The result was expressed as an index value with the value of Standard Example 3 expressed as an index value of 100. A smaller index value indicates lower heat build-up.

The results are shown in Tables 5 and 6.

TABLE 5

|  | Standard Example 3 | Comparative Example 25 | Comparative Example 26 | Comparative Example 27 | Example 25 |
|---|---|---|---|---|---|
| SBR *33 | 110.0 | 110.0 | 110.0 | 110.0 | 110.0 |
| BR *34 | 20.0 | 20.0 | 20.0 | 20.0 | 20.0 |
| Silica-1 *35 | 90.0 | 90.0 | 90.0 | 90.0 | 90.0 |
| Silica-2 *36 | — | — | — | — | — |
| Carbon black *37 | 5.0 | 5.0 | 5.0 | 5.0 | 5.0 |
| Silane coupling agent-1 *38 | 7.2 | 7.2 | 7.2 | 7.2 | 7.2 |
| Zinc oxide *39 | 3.0 | 3.0 | 3.0 | 3.0 | 3.0 |
| Stearic acid *40 | 2.0 | 2.0 | 2.0 | 2.0 | 2.0 |

TABLE 5-continued

|  | | | | | |
|---|---|---|---|---|---|
| Anti-aging agent *41 | 1.5 | 1.5 | 1.5 | 1.5 | 1.5 |
| Process oil *42 | 30.0 | 30.0 | 30.0 | 30.0 | 30.0 |
| Glycerol monofatty acid ester-1 *43 | — | — | — | 6.0 | 6.0 |
| Glycerol monooleic acid ester-2 *43' | — | — | — | — | — |
| Glycerol monobehenic acid ester-3 *43" | — | — | — | — | — |
| Fatty acid ester for comparison-1 *44 | — | — | — | — | — |
| Fatty acid ester for comparison-2 *44' | — | — | — | — | — |
| Sulfur *45 | 2.0 | 2.0 | 2.0 | 2.0 | 2.0 |
| Vulcanization accelerator-1 (CZ) *46 | 2.0 | 1.0 | 1.0 | 2.0 | 1.0 |
| Vulcanization accelerator-2 (DPG) *47 | — | 0.8 | 1.0 | — | 0.8 |
| Vulcanization accelerator-3 (TOT-N) *48 | — | 0.2 | 0.4 | — | 0.2 |
| Vulcanization accelerator-4 (TT) *48' | — | — | — | — | — |
| Vulcanization accelerator-5 (TBzTD) *48" | — | — | — | — | — |
| Vulcanization accelerator-6 (Vulcuren) *48''' | — | — | — | — | — |
| Silane coupling agent-2 *49 | — | — | — | — | — |
| Measurement results | | | | | |
| T95 | 100 | 95 | 90 | 105 | 85 |
| Bending fatigue resistance | 100 | 95 | 85 | 105 | 105 |
| Hardness (20° C.) | 100 | 100 | 105 | 100 | 100 |
| tan δ (60° C.) | 100 | 95 | 90 | 95 | 85 |

|  | Example 26 | Comparative Example 28 | Comparative Example 29 | Comparative Example 30 | Example 27 |
|---|---|---|---|---|---|
| SBR *33 | 110.0 | 110.0 | 110.0 | 110.0 | 110.0 |
| BR *34 | 20.0 | 20.0 | 20.0 | 20.0 | 20.0 |
| Silica-1 *35 | 90.0 | 90.0 | — | 50.0 | 90.0 |
| Silica-2 *36 | — | — | 90.0 | — | — |
| Carbon black *37 | 5.0 | 5.0 | 5.0 | 5.0 | 5.0 |
| Silane coupling agent-1 *38 | 7.2 | 7.2 | 7.2 | 7.2 | 7.2 |
| Zinc oxide *39 | 3.0 | 3.0 | 3.0 | 3.0 | 3.0 |
| Stearic acid *40 | 2.0 | 2.0 | 2.0 | 2.0 | 2.0 |
| Anti-aging agent *41 | 1.5 | 1.5 | 1.5 | 1.5 | 1.5 |
| Process oil *42 | 30.0 | 30.0 | 20.0 | 10.0 | 30.0 |
| Glycerol monofatty acid ester-1 *43 | 6.0 | — | 6.0 | 6.0 | 6.0 |
| Glycerol monooleic acid ester-2 *43' | — | — | — | — | — |
| Glycerol monobehenic acid ester-3 *43" | — | — | — | — | — |
| Fatty acid ester for comparison-1 *44 | — | 6.0 | — | — | — |
| Fatty acid ester for comparison-2 *44' | — | — | — | — | — |
| Sulfur *45 | 2.0 | 2.0 | 2.0 | 2.0 | 2.0 |
| Vulcanization accelerator-1 (CZ) *46 | 1.5 | 1.0 | 1.0 | 1.0 | 1.0 |
| Vulcanization accelerator-2 (DPG) *47 | — | 0.8 | 0.8 | 0.8 | 0.8 |
| Vulcanization accelerator-3 (TOT-N) *48 | 0.5 | 0.2 | 0.2 | 0.2 | 0.2 |
| Vulcanization accelerator-4 (TT) *48' | — | — | — | — | — |
| Vulcanization accelerator-5 (TBzTD) *48" | — | — | — | — | — |
| Vulcanization accelerator-6 (Vulcuren) *48''' | — | — | — | — | — |
| Silane coupling agent-2 *49 | — | — | — | — | 3.0 |
| Measurement results | | | | | |
| T95 | 80 | 90 | 85 | 85 | 80 |
| Bending fatigue resistance | 105 | 95 | 105 | 105 | 110 |
| Hardness (20° C.) | 105 | 95 | 85 | 80 | 105 |
| tan δ (60° C.) | 85 | 110 | 90 | 90 | 70 |

TABLE 6

|  | Standard Example 3 | Example 28 | Example 29 | Comparative Example 31 | Example 30 |
|---|---|---|---|---|---|
| SBR *33 | 110.0 | 110.0 | 110.0 | 110.0 | 110.0 |
| BR *34 | 20.0 | 20.0 | 20.0 | 20.0 | 20.0 |
| Silica-1 *35 | 90.0 | 90.0 | 90.0 | 90.0 | 90.0 |

TABLE 6-continued

|  | | | | | |
|---|---|---|---|---|---|
| Silica-2 *36 | — | — | — | — | — |
| Carbon black *37 | 5.0 | 5.0 | 5.0 | 5.0 | 5.0 |
| Silane coupling agent-1 *38 | 7.2 | 7.2 | 7.2 | 7.2 | 7.2 |
| Zinc oxide *39 | 3.0 | 3.0 | 3.0 | 3.0 | 3.0 |
| Stearic acid *40 | 2.0 | 2.0 | 2.0 | 2.0 | 2.0 |
| Anti-aging agent *41 | 1.5 | 1.5 | 1.5 | 1.5 | 1.5 |
| Process oil *42 | 30.0 | 30.0 | 30.0 | 30.0 | 30.0 |
| Glycerol monofatty acid ester-1 *43 | — | — | — | — | 6.0 |
| Glycerol monooleic acid ester-2 *43' | — | 6.0 | — | — | — |
| Glycerol monobehenic acid ester-3 *43" | — | — | 6.0 | — | — |
| Fatty acid ester for comparison-1 *44 | — | — | — | — | — |
| Fatty acid ester for comparison-2 *44' | — | — | — | 6.0 | — |
| Sulfur *45 | 2.0 | 2.0 | 2.0 | 2.0 | 2.0 |
| Vulcanization accelerator-1 (CZ) *46 | 2.0 | 1.0 | 1.0 | 1.0 | 1.0 |
| Vulcanization accelerator-2 (DPG) *47 | — | 0.8 | 0.8 | 0.8 | 0.8 |
| Vulcanization accelerator-3 (TOT-N) *48 | — | 0.2 | 0.2 | 0.2 | — |
| Vulcanization accelerator-4 (TT) *48' | — | — | — | — | 0.2 |
| Vulcanization accelerator-5 (TBzTD) *48" | — | — | — | — | — |
| Vulcanization accelerator-6 (Vulcuren) *48" | — | — | — | — | — |
| Silane coupling agent-2 *49 | — | — | — | — | — |
| Measurement results | | | | | |
| T95 | 100 | 80 | 90 | 90 | 80 |
| Bending fatigue resistance | 100 | 110 | 105 | 100 | 105 |
| Hardness (20° C.) | 100 | 105 | 100 | 95 | 100 |
| tan δ (60° C.) | 100 | 80 | 85 | 105 | 80 |

|  | Example 31 | Example 32 | Comparative Example 32 | Example 33 |
|---|---|---|---|---|
| SBR *33 | 110.0 | 110.0 | 110.0 | 110.0 |
| BR *34 | 20.0 | 20.0 | 20.0 | 20.0 |
| Silica-1 *35 | 90.0 | 90.0 | 90.0 | 90.0 |
| Silica-2 *36 | — | — | — | — |
| Carbon black *37 | 5.0 | 5.0 | 5.0 | 5.0 |
| Silane coupling agent-1 *38 | 7.2 | 7.2 | 7.2 | 7.2 |
| Zinc oxide *39 | 3.0 | 3.0 | 3.0 | 3.0 |
| Stearic acid *40 | 2.0 | 2.0 | 2.0 | 2.0 |
| Anti-aging agent *41 | 1.5 | 1.5 | 1.5 | 1.5 |
| Process oil *42 | 30.0 | 30.0 | 30.0 | 30.0 |
| Glycerol monofatty acid ester-1 *43 | 6.0 | 6.0 | 0.1 | 10.0 |
| Glycerol monooleic acid ester-2 *43' | — | — | — | — |
| Glycerol monobehenic acid ester-3 *43" | — | — | — | — |
| Fatty acid ester for comparison-1 *44 | — | — | — | — |
| Fatty acid ester for comparison-2 *44' | — | — | — | — |
| Sulfur *45 | 2.0 | 2.0 | 2.0 | 2.0 |
| Vulcanization accelerator-1 (CZ) *46 | 1.0 | 1.0 | 1.0 | 1.0 |
| Vulcanization accelerator-2 (DPG) *47 | 0.8 | 0.8 | 0.8 | 0.8 |
| Vulcanization accelerator-3 (TOT-N) *48 | — | — | 0.2 | 0.2 |
| Vulcanization accelerator-4 (TT) *48' | — | — | — | — |
| Vulcanization accelerator-5 (TBzTD) *48" | 0.2 | — | — | — |
| Vulcanization accelerator-6 (Vulcuren) *48" | — | 0.2 | — | — |
| Silane coupling agent-2 *49 | — | — | — | — |
| Measurement results | | | | |
| T95 | 70 | 90 | 95 | 85 |
| Bending fatigue resistance | 105 | 120 | 95 | 105 |
| Hardness (20° C.) | 105 | 100 | 100 | 105 |
| tan δ (60° C.) | 80 | 85 | 95 | 80 |

|  | Comparative Example 33 | Comparative Example 34 | Example 34 | Comparative Example 35 |
|---|---|---|---|---|
| SBR *33 | 110.0 | 110.0 | 110.0 | 110.0 |
| BR *34 | 20.0 | 20.0 | 20.0 | 20.0 |
| Silica-1 *35 | 90.0 | 90.0 | 90.0 | 90.0 |
| Silica-2 *36 | — | — | — | — |
| Carbon black *37 | 5.0 | 5.0 | 5.0 | 5.0 |
| Silane coupling agent-1 *38 | 7.2 | 7.2 | 7.2 | 7.2 |
| Zinc oxide *39 | 3.0 | 3.0 | 3.0 | 3.0 |
| Stearic acid *40 | 2.0 | 2.0 | 2.0 | 2.0 |
| Anti-aging agent *41 | 1.5 | 1.5 | 1.5 | 1.5 |
| Process oil *42 | 30.0 | 30.0 | 30.0 | 30.0 |
| Glycerol monofatty acid ester-1 *43 | 30.0 | 6.0 | 6.0 | 6.0 |
| Glycerol monooleic acid ester-2 *43' | — | — | — | — |
| Glycerol monobehenic acid ester-3 *43" | — | — | — | — |
| Fatty acid ester for comparison-1 *44 | — | — | — | — |
| Fatty acid ester for comparison-2 *44' | — | — | — | — |
| Sulfur *45 | 2.0 | 2.0 | 2.0 | 2.0 |

TABLE 6-continued

| | | | | |
|---|---|---|---|---|
| Vulcanization accelerator-1 (CZ) *46 | 1.0 | 1.0 | 1.0 | 1.0 |
| Vulcanization accelerator-2 (DPG) *47 | 0.8 | 0.8 | 0.8 | 0.8 |
| Vulcanization accelerator-3 (TOT-N) *48 | 0.2 | 0.05 | 0.5 | 6.5 |
| Vulcanization accelerator-4 (TT) *48' | — | — | — | — |
| Vulcanization accelerator-5 (TBzTD) *48" | — | — | — | — |
| Vulcanization accelerator-6 (Vulcuren) *48''' | — | — | — | — |
| Silane coupling agent-2 *49 | — | — | — | — |
| Measurement results | | | | |
| T95 | 70 | 105 | 60 | 45 |
| Bending fatigue resistance | 90 | 110 | 105 | 40 |
| Hardness (20° C.) | 100 | 95 | 100 | 110 |
| tan δ (60° C.) | 105 | 105 | 80 | 75 |

*33: SBR (Tufdene 3830, manufactured by Asahi Kasei Corporation; oil extender content = 37.5 parts by mass per 100 parts by mass of SBR)
*34: BR (Nipol BR1220, manufactured by Zeon Corporation)
*35: Silica-1 (Ultrasil 9000GR, manufactured by Evonik Degussa; BET specific surface area = 235 $m^2/g$)
*36: Silica-2 (Zeosil 1165GR, manufactured by Rhodia; nitrogen adsorption specific surface area ($N_2SA$) = 165 $m^2/g$)
*37: Carbon black (Sho Black N339, manufactured by Cabot Japan K.K.; nitrogen adsorption specific surface area ($N_2SA$) = 90 $m^2/g$)
*38: Silane coupling agent-1 (Si69, manufactured by Evonik Degussa; bis(3-triethoxysilylpropyl)tetrasulfide)
*39: Zinc oxide (Zinc Oxide III, manufactured by Seido Chemical Industry Co., Ltd.)
*40: Stearic acid (Beads Stearic Acid YR, manufactured by NOF Corporation)
*41: Anti-aging agent (Santoflex 6PPD, manufactured by Solutia Europe)
*42: Process oil (Extract No. 4S, manufactured by Showa Shell Sekiyu K.K.)
*43: Glycerol monofatty acid ester-1 (glycerol monostearate, manufactured by Sigma-Aldrich Co. LLC.)
*43': Glycerol monofatty acid ester-2 (glycerol monooleate)
*43": Glycerol monofatty acid ester-3 (glycerol monobehenate)
*44: Fatty acid ester for comparison-1 (glycerin, manufactured by Sigma-Aldrich Co. LLC.)
*44': Fatty acid ester for comparison-2 (glycerol monobutyrate)
*45: Sulfur (oil-treated sulfur, manufactured by Karuizawa Refinery Ltd.)
*46: Vulcanization accelerator-1 (Nocceler CZ-G, manufactured by Ouchi Shinko Chemical Industrial Co., Ltd., sulfenamide-based)
*47: Vulcanization accelerator-2 (Perkacit DPG, manufactured by Flexsys, diphenylguanidine-based)
*48: Vulcanization accelerator-3 (Nocceler TOT-N, manufactured by Ouchi Shinko Chemical Industrial Co., Ltd., thiuram-based)
*48': Vulcanization accelerator-4 (Nocceler TT, manufactured by Ouchi Shinko Chemical Industrial Co., Ltd., thiuram-based)
*48": Vulcanization accelerator-5 (Nocceler TBzTD, manufactured by Ouchi Shinko Chemical Industrial Co., Ltd., thiuram-based)
*48''': Vulcanization accelerator-6 (Vulcuren, manufactured by Lanxess, thiuram-based)
*49: Silane coupling agent-2 (n-octyltriethoxysilane; KBE-3083, manufactured by Shin-Etsu Chemical Co., Ltd.)

As is clear from the results shown in Tables 5 and 6 below, because the rubber compositions of Examples 25 and 26 and 28 to 34 contained, in the diene rubber, particular amounts of the silica having the particular specific surface area, the silane coupling agent, the particular glycerol monofatty acid ester and the thiuram-based vulcanization accelerator, the dispersibility of the silica was enhanced even for the case that silica having a high specific surface area was contained in a large amount, the vulcanization rate was not reduced, superior bending fatigue resistance was achieved, and the hardness and the heat build-up were maintained or enhanced, compared to those of standard example.

On the other hand, because Comparative Examples 25 and 26 did not contain the particular glycerol monofatty acid ester, Comparative Examples 25 and 26 exhibited poor bending fatigue resistance.

Because Comparative Example 27 did not contain the thiuram-based vulcanization accelerator, the vulcanization rate was deteriorated.

Comparative example 28, which was an example where glycerin was used in place of the glycerol monofatty acid ester, exhibited deterioration in the bending fatigue resistance, hardness, and heat build-up.

In Comparative Example 29, because the nitrogen adsorption specific surface area ($N_2SA$) of the silica was less than 200 $m^2/g$, the hardness was reduced.

In Comparative Example 30, because the compounded amount of the silica was less than the lower limit specified in the present technology, the hardness was reduced.

In Comparative Example 31, which was an example where the glycerol monobutyric acid ester was contained, the hardness was reduced.

In Comparative Example 32, because the compounded amount of the glycerol monofatty acid ester was less than the lower limit specified in the present technology, the bending fatigue resistance was deteriorated.

In Comparative Example 33, because the compounded amount of the glycerol monofatty acid ester was greater than the upper limit specified in the present technology, the bending fatigue resistance and heat build-up were deteriorated.

In Comparative Example 34, because the compounded amount of the thiuram-based vulcanization accelerator was less than the lower limit specified in the present technology, the vulcanization rate, the hardness, and the heat build-up were deteriorated.

In Comparative Example 35, because the compounded amount of the thiuram-based vulcanization accelerator was greater than the upper limit specified in the present technology, the bending fatigue resistance was deteriorated.

Example 27

Example 25 was repeated, but further blending 3.0 parts by mass of n-octyltriethoxysilane (KBE-3083, manufactured by Shin-Etsu Chemical Co., Ltd.).

The results are also shown in Table 5. It was found that the vulcanization rate and the heat build-up were even further enhanced.

The invention claimed is:
1. A rubber composition, comprising:
(A) a diene rubber,
(B) from 5 to 200 parts by mass of silica per 100 parts by mass of the diene rubber, a nitrogen adsorption specific surface area ($N_2SA$) of the silica being from 150 to 300 $m^2/g$,

(C) from 1 to 20 mass % of a sulfur-containing silane coupling agent relative to the amount of the silica,
(D) from 1 to 20 parts by mass of a fatty acid metal salt per 100 parts by mass of the diene rubber,
(E) from 1 to 20 mass % of a glycerol fatty acid ester component relative to the mass of the silica (B);
wherein the glycerol fatty acid ester component consists of a glycerol monofatty acid ester derived from a fatty acid having from 8 to 24 carbons and wherein the glycerol fatty acid ester component consisting of the glycerol monofatty acid ester is the only glycerol fatty acid ester component in the rubber composition; and
(F) one or more types selected from the group consisting of copolymers (1) to (3) below and hydrogenated products (4) below:
(1) α-pinene-aromatic vinyl copolymers;
(2) β-pinene-aromatic vinyl copolymers;
(3) copolymers of an aromatic vinyl and two or more types selected from the group consisting of α-pinene, β-pinene, and dipentene; and
(4) hydrogenated products of the copolymers of (1) to (3) above.

2. The rubber composition according to claim 1, further comprising from 1 to 20 mass % of an alkyltriethoxysilane represented by formula (1) below relative to the amount of the silica, wherein the compounded amount of the glycerol monofatty acid ester (E) is from 10 to 1000 mass % relative to the amount of the alkyltriethoxysilane (D) represented by formula (1):

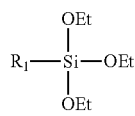

Formula 1 wherein, R1 represents an alkyl group having from 1 to 20 carbons, and Et represents an ethyl group.

3. The rubber composition according to claim 2, wherein the glycerol monofatty acid ester (E) contains an unsaturated bond.

4. The rubber composition according to claim 2, comprising from 6 to 20 mass % of the alkyltriethoxysilane represented by formula (1) relative to the amount of the silica.

5. The rubber composition according to claim 2, comprising from 12 to 40 parts by mass of the alkyltriethoxysilane per 100 parts by mass of diene rubber.

6. The rubber composition according to claim 1, wherein the glycerol monofatty acid ester (E) contains an unsaturated bond.

7. A pneumatic tire using the rubber composition described in claim 1 in a tread.

8. The rubber composition according to claim 1, comprising the (3) copolymers of the aromatic vinyl and two or more types selected from the group consisting of α-pinene, β-pinene, and dipentene.

9. The rubber composition according to claim 1, comprising the hydrogenated products of the copolymers of each of (1), (2) and (3).

10. The rubber composition according to claim 1, comprising from 4 to 20 mass % of the sulfur-containing silane coupling agent relative to the amount of the silica.

11. The rubber composition according to claim 1, comprising (D) from 16 to 20 parts by mass of the fatty acid metal salt per 100 parts by mass of the diene rubber.

* * * * *